United States Patent [19]
Håakansson et al.

[11] Patent Number: 5,933,797
[45] Date of Patent: Aug. 3, 1999

[54] ADAPTIVE DUAL FILTER ECHO CANCELLATION

[75] Inventors: Stefan Håakansson, Sollentuna; Claes Hammar, Täby; Tönu Trump, Stockholm, all of Sweden

[73] Assignee: Telefonaktiebolaget LM Ericsson (publ), Stockholm, Sweden

[21] Appl. No.: 08/810,601

[22] Filed: Feb. 28, 1997

[51] Int. Cl.⁶ .................................................. H04B 3/23
[52] U.S. Cl. .................... 702/191; 702/107; 702/190; 364/724.19; 364/724.13; 379/3; 379/406; 379/410
[58] Field of Search .................. 364/572, 724.19, 364/574, 724.13, 736.01; 379/3, 399, 406, 410; 320/282, 286, 289; 325/232; 455/570; 381/71.1; 348/607, 611; 702/107, 189, 190, 191

[56] References Cited

U.S. PATENT DOCUMENTS

| | | | |
|---|---|---|---|
| 5,001,661 | 3/1991 | Corleto et al. | 364/724.19 |
| 5,151,937 | 9/1992 | Chujo et al. | 379/410 |
| 5,175,702 | 12/1992 | Beraud et al. | 364/736 |
| 5,297,071 | 3/1994 | Sugino | 364/736 |
| 5,327,459 | 7/1994 | Hara et al. | 375/14 |
| 5,371,789 | 12/1994 | Hirano | 379/410 |
| 5,381,357 | 1/1995 | Wedgwood et al. | 364/724.16 |
| 5,388,092 | 2/1995 | Koyama et al. | 370/32.1 |
| 5,396,299 | 3/1995 | Greenberg | 348/614 |
| 5,396,517 | 3/1995 | Yedid et al. | 375/233 |
| 5,526,377 | 6/1996 | Yedid et al. | 375/229 |
| 5,581,494 | 12/1996 | Sommen et al. | 364/724.16 |
| 5,631,957 | 5/1997 | Greiss et al. | 379/406 |
| 5,652,903 | 7/1997 | Weng et al. | 395/800 |
| 5,721,782 | 2/1998 | Piket et al. | 381/66 |
| 5,745,396 | 4/1998 | Shanbag | 364/724.19 |

FOREIGN PATENT DOCUMENTS

| | | |
|---|---|---|
| 0 439 139 A2 | 1/1991 | European Pat. Off. . |
| 0505884 | 9/1992 | European Pat. Off. ........ G06F 15/78 |
| 3159423 | 7/1991 | Japan . |
| 7288493 | 10/1995 | Japan . |
| 8602181 | 4/1986 | WIPO ............................... G06F 7/48 |

OTHER PUBLICATIONS

A Double Talk Detector Based on Coherence by Tomas Gänsler, Maria Hansson and Göran Salomonsson Signal Processing Group, Dept. of Elec. Eng. and Comp. Science Lund University, Box 118, S–221 00 Lund, Sweden pp. 332–336.

Echo Canceler with Two Echo Path Models by Kazuo Ochiai, Takashi Araseki and Takashi Ogihara IEEE Transaction on Communications, vol. Com–25, No. 6, Jun. 1977 pp. 589–595.

Proceedings of IEEE, USA, Sep. 1987, *DSP56200: An Algorithm–Specific Digital Signal Processor Peripheral*; Garth D. Hillman.; XP000031791.

*Primary Examiner*—Patrick Assouad
*Attorney, Agent, or Firm*—Jenkens & Gilchrist, PC

[57] ABSTRACT

A digital signal processor that is used for echo cancellation computations is disclosed, which includes parallel multiplier/adders, an input signal sample memory, and a plurality of accumulators for temporarily storing the results of the computations performed. Consequently, not all of the computational results have to be saved in an external data memory, which minimizes data transfer bottlenecks and significantly increases the computational efficiency of the digital signal processor. The adaptive filter coefficient updates can thereby be computed much faster, and the adaptive filter coefficients can be copied much faster from one filter to the other. The computational complexity of the digital signal processor is significantly less than that of prior digital signal processors.

18 Claims, 3 Drawing Sheets

ADAPTIVE DUAL FILTER ECHO CANCELLATION

BACKGROUND OF THE INVENTION

1. Technical Field of the Invention

The present invention relates in general to the telecommunications field and, in particular, to echo cancellation in telephony systems.

2. Description of Related Art

"Echo" is a phenomenon that can occur in a telephony system whenever a portion of transmitted speech signal energy is reflected back to a sender. These reflections are caused by impedance mismatches in analog portions of the telephony network. There can be many different sources of echo, such as, for example, a hybrid circuit that converts a 4-wire line to a 2-wire line in a Public Switched Telephone Network (PSTN) subscriber interface, or acoustical crosstalk in a mobile radiotelephone. The presence of echo along with a substantial delay (e.g., physical distance or processing delay) can severely degrade the quality of the speech signals being processed.

An echo canceller is a device that is commonly used in telephony systems to suppress or remove echos in long distance traffic. For example, in cellular Public Land Mobile Networks (PLMNs), echo cancellers are used in mobile services switching centers (MSCs) to suppress or remove echos in speech traffic. Echo cancellers are also used in mobile radiotelephones and "handsfree" telephone equipment to compensate for acoustical echos. A general description of an existing echo cancellation technique can be found in the paper entitled: "A Double Talk Detector Based on Coherence" by Gänsler et al, *Signal Processing Group, Dept. of Elec. Eng. and Comp. Science,* Lund University, Sweden.

FIG. 1 is a simplified schematic block diagram of a conventional echo canceller (10). The main component of such an echo canceller is an adaptive finite-impulse-response (FIR) filter 12. Under the control of an adaptation algorithm (e.g., executed in software), filter 12 models the impulse response of the echo path. Typically, filter 12 is adapted using a Least Mean Squares (LMS) algorithm. A non-linear processor (NLP) 14 is used to remove residual echo that may remain after linear processing of the input signal.

The signals involved in a telephone call are nonstationary in nature. Consequently, the echo canceller (10) typically includes a double-talk detector (DTD) 16, which is used to control and inhibit the adaptation process when the echo signal to "near end" signal ratio is of such a value that no additional improvement in the echo path estimation can be obtained by further adaptation of filter 12. However, in order to be able to track variations in the echo path, it is not possible to inhibit the adaptation too often, and under those conditions some degradation of the echo path estimate will occur if the echo signal-to-noise ratio worsens. The block denoted by 18 represents the echo source in the telephony system which generates the "desired" signal, y(t), as a function of the "far end" signal, x(t), and the "near end" signal, v(t).

A dual filter structure that has been proposed to cope with this degradation problem was described in the article entitled: "Echo Canceller with Two Echo Path Models," by Kazuo Ochiai et al, IEEE Transactions on Communications, Vol. COM-25, No. 6, June 1977. As shown generally in FIG. 2, the technique described in this article uses a fixed filter (20) for echo cancellation and an adaptive filter (22) for echo path estimation. If a good enough echo path estimate can be obtained by the adaptive filter (22), the coefficients of the adaptive filter are copied into the fixed filter (20). Consequently, these better coefficients can be used for the cancellation if the echo path estimate worsens.

An improvement to the control strategy for the dual filter structure described directly above has been disclosed in a commonly-assigned Swedish Patent No. 9503640-6, entitled "An Adaptive Dual Filter Echo Cancellation Method" to Johnny Karlsen et al. According to the method described therein, both filters are used for echo cancellation, and the filters' coefficients can be transferred in both directions. This patent describes certain conditions used to decide which of the two filter outputs, $e_a$ or $e_f$, are to be used as the output for the echo canceller, as well as when the coefficients are to be transferred from one filter to the other. These decisions are based on comparisons of power and correlation estimates for the signals involved, and, therefore, make the algorithms being used highly data dependent.

Most existing echo cancellers utilize a general purpose digital signal processor (DSP) as a central computational element. A generic, general purpose DSP architecture that has been used for echo cancellation is shown in FIG. 3. For example, referring to FIG. 3, a DSP 30 used for echo cancellation includes two data memory sections 32 and 34 and corresponding data busses 32a and 34a, an address arithmetic unit (AAU) 36, a multiplier section 38, an arithmetic logic unit (ALU) 40, and a shifter 42.

Also, it has been possible to assemble an echo canceller from computational blocks that correspond to the functional blocks in the adaptive algorithm described above in the Ochiai et al article (FIG. 2). However, since the filter adaptation technique described therein relies on use of the current error signal, e(t), which is available for the first time only after the filtering process has been performed, the operations that correspond to the functional blocks in the Ochiai algorithm would have to be executed in series anyway, and no significant efficiencies would be derived. Moreover, the substantial amount of hardware needed to accomplish such functions would not significantly improve the overall performance of an echo canceller.

A problem arises if "long" filters (e.g., N=512 or more) are utilized for adaptive echo cancellation, since a relatively large number of computations have to be performed. In that case, it is very important to optimize the processor's architecture to match the functions of the algorithm being used. At the same time, it is also important to keep the amount of hardware resources being used within reasonable limits.

A general purpose DSP used for echo cancellation (e.g., DSP 30 in FIG. 3) has only two data busses (e.g., 32a, 34a). Consequently, such a DSP is only capable of making a maximum of two memory accesses per clock cycle (e.g., one access to each of the memory sections 32 and 34). Consequently, there was a data transfer bottleneck that significantly lowered the DSP's computational efficiency.

For example, the LMS update equation for an algorithm executed by such a DSP can be expressed as:

$$h_n(t+1)=h_n(t)+\alpha(t)x_n(t), \tag{1}$$

where $\alpha(t)=\mu e(t)$ if a basic LMS value is used, or $$\alpha(t) = \frac{\mu e(t)}{\sum_{n=1}^{N} x_n^2(t)}, \quad (2)$$

if a normalized LMS value is used. In any event, $\alpha(t)$ is a constant multiplier during each sample interval. In Equation 1 above, $x_n(t)$ is the nth signal sample at time t, $h_n(t)$ is the nth adaptive filter coefficient at time t, e(t) is the error signal, and $\mu$ is a small constant that represents the sample stepsize.

In most signal processors, the multiplier, a(t), can be stored in a multiplier register and maintained there until all of the filter coefficients have been updated. Then, the LMS update equation (Equation 1) requires two read operations from the memory sections and one write operation to the coefficient memory section. These operations cannot be accomplished over the two data busses during a single clock cycle, and consequently, two clock cycles are required to run an update for each value of N. Generally, N is determined by the length of the impulse response of the echo path involved. A value of 512 for N is quite commonly used for typical echo cancellation applications. However, N can be as high as several thousand for acoustical echo cancellation applications.

The process of filtering the input signal with a FIR filter can be expressed as follows:

$$y(t) = \sum_{n=1}^{N} h_n(t)x_n(t), \quad (3)$$

which obviously requires one clock cycle per value of N to compute an output sample, y(t). Since the dual filter technique described earlier utilizes two FIR filters, it follows that two clock cycles per value of N would be needed to compute the corresponding two output samples.

Coefficients of the two FIR filters are copied from one to the other according to decisions made by a signal dependent control algorithm. If it is desirable to perform FIR filtering with a single clock cycle per value of N, as assumed above, then the coefficients for both filters should be located in one memory section, and the signal samples, x(t), should be located in the other memory section. This arrangement implies that the coefficient copy operation would require two cycles per value of N, because copying one filter coefficient would require two accesses to the same memory section.

Consequently, the peak complexity of the complete filtering portion of the dual filter approach described above is measured as 6*N for a general purpose DSP. In other words, the general purpose DSP would take 6*N cycles to complete the filter computations. However, this level of complexity is relatively high for the large values of N that are required in echo canceller applications, which leaves only a relatively small (if any) processing capacity for the control portion of the algorithm and other necessary echo canceller functions.

SUMMARY OF THE INVENTION

It is, therefore, an object of the present invention to minimize the computation time of a digital signal processor used for echo cancellation.

It another object of the present invention to minimize data transfer bottlenecks in a digital signal processor used for echo cancellation It is yet another object of the present invention to maximize the speed of the least mean square update, filtering, and coefficient copying computations of a digital signal processor used for echo cancellation.

It is still another object of the present invention to implement an efficient adaptive dual filter echo canceller.

In accordance with the present invention, the foregoing and other objects are achieved by a digital signal processor that is used for echo cancellation computations, which includes parallel multiplier/adders, an input signal sample memory, and a plurality of accumulators for temporarily storing the results of the computations performed. Consequently, not all of the computational results have to be saved in an external data memory, which minimizes data transfer bottlenecks and significantly increases the computational efficiency of the digital signal processor. The adaptive filter coefficient updates can thereby be computed much faster, and the adaptive filter coefficients can be copied much faster from one filter to the other. The computational complexity of the digital signal processor is significantly less than that of prior digital signal processors.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

The preferred embodiment of the present invention and its advantages are best understood by referring to FIGS. 1–4 of the drawings, like numerals being used for like and corresponding parts of the various drawings.

Figure 1:
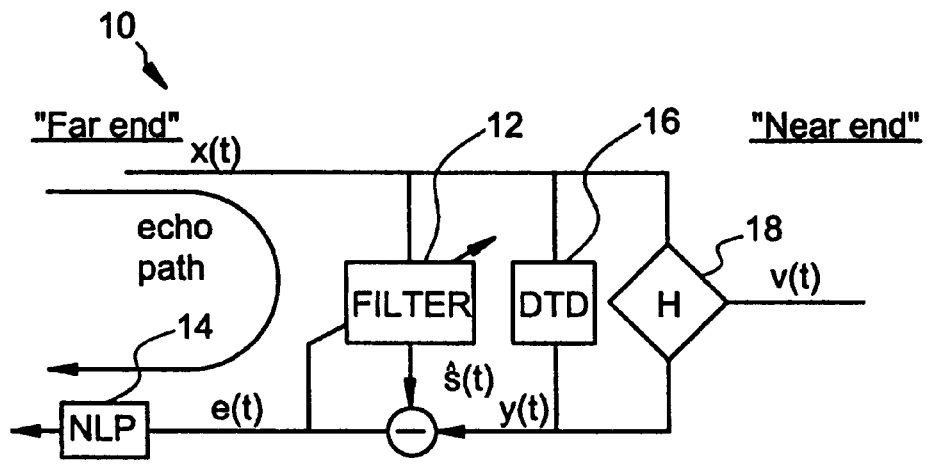
FIG. 1 is a simplified schematic block diagram of a conventional echo canceller.
Figure 2:
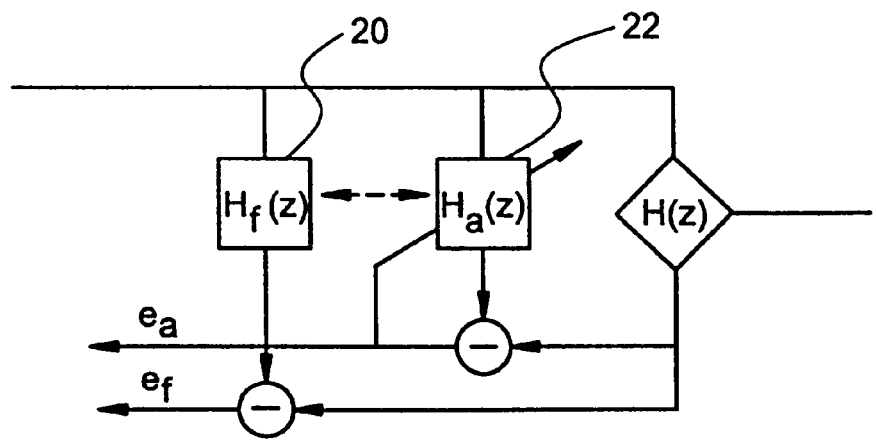
FIG. 2 is a simplified schematic block diagram of an existing dual filter echo canceller.
Figure 3:
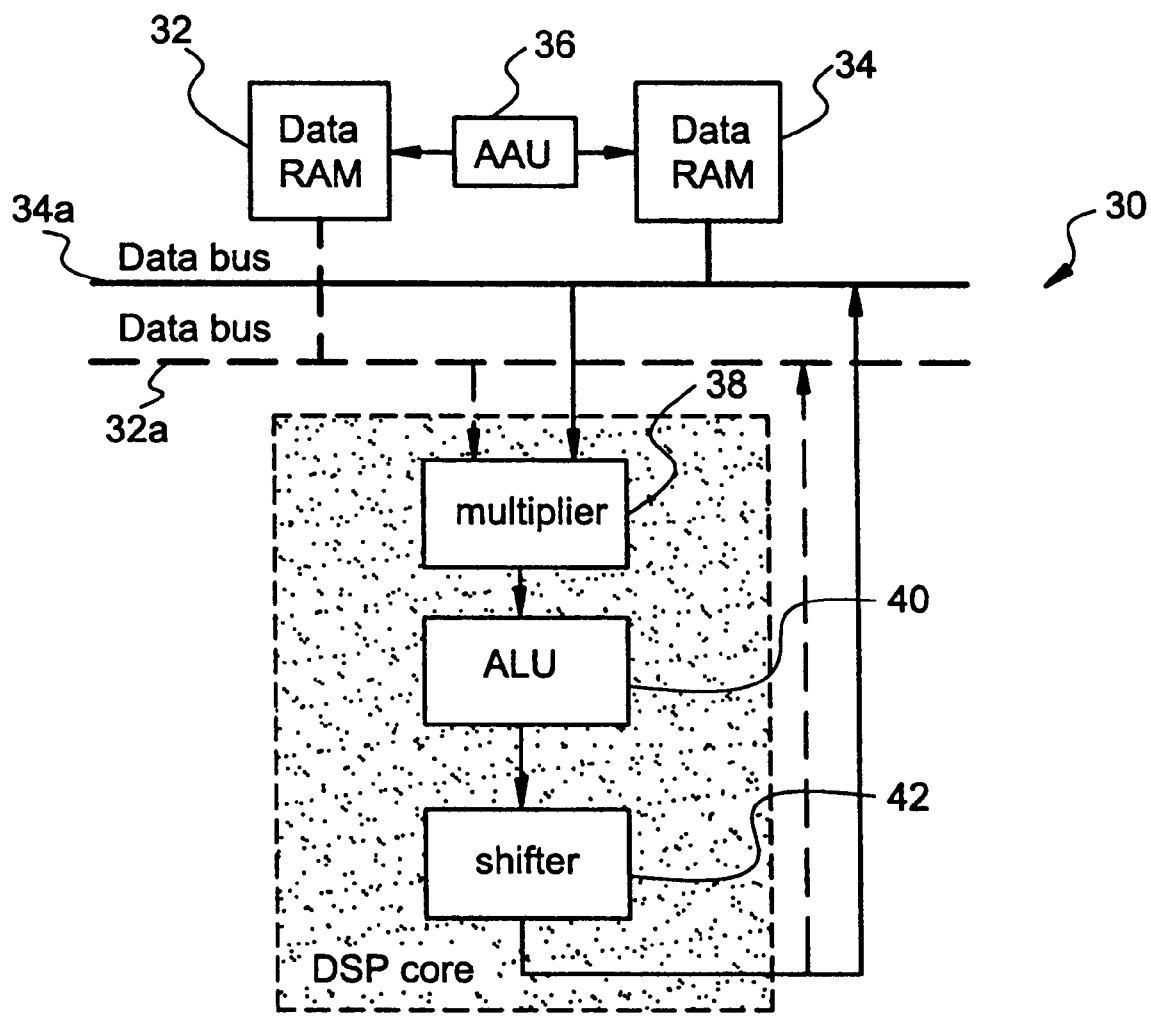
FIG. 3 is a block diagram of a generic, general purpose digital signal processor architecture that has been used for echo cancellation.
Figure 4:
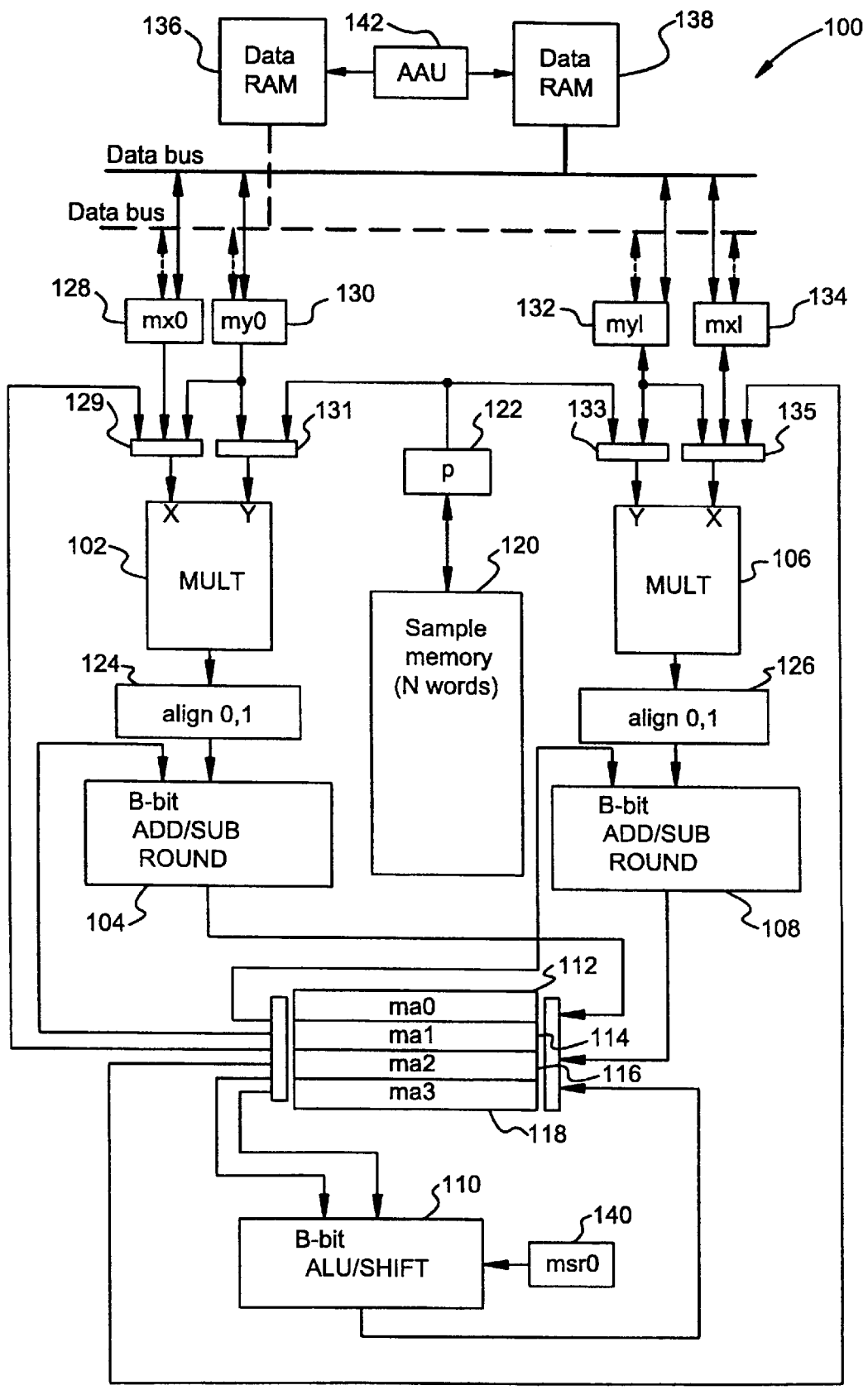
FIG. 4 is a block diagram of a dual filter digital signal processor for use in echo cancellation, which is structured to function in accordance with a preferred embodiment of the present invention.

FIG. 4 is a block diagram of a dual filter DSP for use in echo cancellation, which is structured to function in accordance with a preferred embodiment of the present invention. For this embodiment, which can be implemented, for example, in an Application Specific Integrated Circuit (ASIC), dual filter DSP 100 includes three basic computational units: a pair of multiplier/adder units (102/104 and 106/108); and a B-bit ALU/barrel shifter 110. Preferably, the respective physical and electrical characteristics of the pair of multiplier/adder units are the same (within expected tolerances). All of these computational units are coupled together for processing and temporary storage of computational results, by a set of four B-bit accumulators 112, 114, 116 and 118. Preferably, four accumulators are used for this embodiment, but any appropriate number of accumulators more than two may be used. Also included is a sample memory 120 with N word memory locations for storing input signal samples. The input samples are represented by the expression, x(t), as shown in the LMS update equation (Equation 3) described above. Notably, although the processing architecture shown in FIG. 4 is preferably implemented with a DSP, the invention is not intended to be so limited. For example, the architecture shown in FIG. 4 can be implemented in any appropriate processing apparatus that can adequately perform the functions described with respect to FIG. 4.

The sample memory 120 is connected to the inputs of multipliers 102 and 106 via a register 122. A pair of alignment units 124 and 126 are connected to the respective outputs of multipliers 102 and 106, so that either of the respective multiplication results can be shifted one bit to the left for alignment purposes, if desired. A respective pair of memory registers (128, 130 and 132, 134) is connected to each multiplier 102 and 106 via respective pairs of input/output registers (129, 131 and 133, 135). The memory registers (128, 130, 132 and 134) are connected to the data memories (136 and 138) by means of data busses, for the transfer of data therebetween. Although the two data memories 136 and 138 are located outside the DSP core in the embodiment illustrated by FIG. 4, it is within the scope of the invention to locate the data memories inside the DSP core. A register msr0 (140) is connected to the B-bit ALU 110, which is used to indicate how many bit positions the ALU should shift, if specified.

In operation, the input signal samples to be processed (e.g., N words) are stored in sample memory 120. All other data variables are stored in the data memories 136 and 138. During each sampling interval, the oldest input signal sample in the sample memory 120 is replaced by the most current sample taken. Preferably, a circular post-increment addressing mode is used for accessing the sample memory.

All bits in the memory registers (128, 130, 132, 134) can be loaded from or stored to both of the data memories 136 and 138. The data busses connecting the memory registers and data memories are b bits wide, where b is the number of bits needed to adequately represent the signal samples and filter coefficients. In this embodiment, the accumulators (112, 114, 116, 118) and ALU 110 are designed to allow a $B \geq 2b + \log_2 N$ bit representation of the variables involved. This choice for B bits assumes that the processor being used is operating with fixed point arithmetic. If floating point computational units are to be used, a natural choice would be to use b=B. However, for this illustrative embodiment (FIG. 4), which is preferably a fixed point implementation, the values b=16 and B=40 can be used.

For this embodiment, basically there are three operations that are implemented by the dual filter echo canceller DSP shown in FIG. 4: (1) coefficient updating; (2) filtering; and (3) coefficient copying. Preferably, the coefficients of both filters are divided equally between the two data memories 136 and 138. For example, the adaptive filter's odd indexed coefficients can be stored in the first data memory (136), and the adaptive filter's even indexed coefficients can be stored in the second data memory (138), or vice versa. For this example, the fixed filter's even indexed coefficients would be stored in the first data memory (136), and the fixed filter's odd indexed coefficients would be stored in the second data memory (138). The input signal samples, $x_n$, are stored in the sample memory 120.

In order for the DSP to perform the coefficient updating operations, before initiating the updating loop, the constant multiplier, $\alpha(t)$, can be retrieved from one data memory (e.g., 136) and stored, for example, in the mx0 register 128. Also, the first coefficient, $h_o(t)$, can be retrieved from that data memory and stored in one of the accumulators (e.g., ma0 or 112). Then, during the first cycle of the coefficient updating loop, the second coefficient can be read from the second data memory (e.g., 138) and stored in another accumulator (e.g., ma1 or 114). During the same cycle, multiplier 102 multiplies the first data sample from sample memory 120 by the constant, $\alpha(t)$, from the mx0 register 128. The B-bit adder 104 adds the product of the multiplication to the first coefficient from the accumulator ma0 (112) and stores the result in that same accumulator.

During the second cycle of the coefficient updating loop, the third coefficient is read from the first data memory (136) and stored in an accumulator (e.g., ma2 or 116). Also, during the same cycle, the multiplier 102 multiplies the second data sample from sample memory 120 by the constant, $\alpha(t)$, from register mx0. The B-bit adder 104 adds the product of the multiplication to the second coefficient from the accumulator ma1 (114) and stores the result in that same accumulator.

During the third cycle of the coefficient updating loop, the fourth coefficient is read from the second data memory (138) and stored in an accumulator (e.g., ma3 or 118). Also, during the same cycle, the multiplier 102 multiplies the third data sample from sample memory 120 by the constant, $\alpha(t)$, from register mx0. The B-bit adder 104 adds the product of the multiplication to the third coefficient from the accumulator ma2 (116) and stores the result in that same accumulator. Additionally, during this cycle, the first updated coefficient from accumulator ma0 (112) is stored at the first coefficient's original location in the first data memory (136). The above-described operations are then repeated until all of the filter coefficients in the data memories have been updated.

In order for the DSP to perform the filtering operation, during each clock cycle, one fixed filter coefficient and the corresponding adaptive filter coefficient are read from their respective data memory locations and stored, for example, in the mx0 and mx1 registers. At the same time, the previously stored fixed and adaptive filter coefficients are read from the mx0 and mx1 registers and multiplied by the respective multipliers 102 and 106 with the corresponding signal sample from the sample memory 120. The respective results are stored and accumulated in two of the accumulators (e.g., ma0 and ma1).

Consequently, in accordance with the present invention, since the corresponding coefficients of the fixed and adaptive filters can be stored in the different data memories, these coefficients can be copied one at a time, without incurring any additional delays. Furthermore, all of the basic operations for an adaptive dual filter echo cancellation algorithm (i.e., LMS coefficient updating, computing an output signal from the two filters, and coefficient copying) can be accomplished within one clock cycle per sample using the DSP architecture shown in FIG. 4. As such, the computational complexity of the DSP architecture shown in FIG. 4 is only 3*N, as opposed to the computational complexity of 6*N for existing general purpose echo cancellation DSPs.

Notably, using the pair of multiplier/adder combinations as shown in FIG. 4 also provides a platform for more efficiently computing the power and correlation estimates used to control the dual filter operations and perform the required comparisons. Also, from an efficiency standpoint, the B-bit ALU 110 can be used for processing other echo canceller functions, such as, for example, the NLP and DTD functions shown in FIG. 1. Furthermore, the use of multiple (e.g., four) accumulators provides a substantial degree of computational flexibility in storing the intermediate results of computational operations, which significantly decreases the number of accesses made to the data memories.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A dual filter echo canceller for cancelling echos in a telephony system, said dual filter echo canceller comprising:
   an adaptive filter;
   a fixed filter coupled to said adaptive filter; and
   a digital signal processor configured to implement the adaptive filter and the fixed filter so as to process during one clock cycle an input signal sample within an adaptive dual filter echo cancellation algorithm including coefficient updating, filtering and coefficient copying between the adaptive filter and fixed filter, said digital signal processor further includes:
   a sample memory for storing the input signal sample;
   a plurality of multipliers, at least one input of each of said plurality of multipliers coupled to an output of said sample memory;
   a plurality of adders, an output of each of said plurality of multipliers coupled to at least one of said plurality of adders; and
   a plurality of temporary storage devices, an input and output of each of said plurality of temporary storage devices selectively coupled to at least one of said plurality of multipliers and said plurality of adders.

2. The dual filter echo canceller of claim 1, further comprising a plurality of data memory devices located in a core of said digital signal processor and used to store coefficients of the adaptive filter and the fixed filter.

3. The dual filter echo canceller of claim 1, further comprising a plurality of data memory devices located outside of a core of said digital signal processor and used to store coefficients of the adaptive filter and the fixed filter.

4. The dual filter echo canceller of claim 1, wherein said digital signal processor further includes a plurality of data memory devices, each of said plurality of data memory devices coupled to an input of at least one of said plurality of multipliers.

5. The dual filter echo canceller of claim 4, wherein each of said plurality of data memory devices is coupled to at least one of said plurality of temporary memory storage devices.

6. The dual filter echo canceller of claim 1, wherein said digital signal processor further includes an arithmetic logic unit, an input and output of said arithmetic logic unit selectively coupled to at least one of said plurality of temporary memory storage devices, said plurality of multipliers, and said plurality of adders.

7. The dual filter echo canceller of claim 6, wherein said digital signal processor further includes a barrel shifter and an arithmetic logic unit for performing calculations required by a control part of the adaptive dual filter echo cancellation algorithm, said barrel shifter and said arithmetic logic unit each connected to at least one of said plurality of temporary storage devices.

8. The dual filter echo canceller of claim 1, wherein each of said temporary memory storage devices comprises an accumulator.

9. The dual filter echo canceller of claim 1, wherein said plurality of multipliers further includes two multipliers.

10. The dual filter echo canceller of claim 1, wherein said plurality of adders further includes two adders.

11. The dual filter echo canceller of claim 1, wherein said plurality of temporary memory storage devices further includes four accumulators.

12. The dual filter echo canceller of claim 1, wherein said input signal sample further includes a speech signal of a far end talker.

13. The dual filter echo canceller of claim 1, wherein said telephony system further includes a selected one of a mobile services switching center and a mobile telephone.

14. A method for cancelling echos using an echo canceller including an adaptive filter and a fixed filter each implemented in a digital signal processor capable of processing during one clock cycle an adaptive dual filter echo cancellation algorithm for an input signal sample, said digital signal processor includes:
   a sample memory for storing the input signal sample;
   a plurality of multipliers, at least one input of each of said plurality of multipliers coupled to an output of said sample memory;
   a plurality of adders, an output of each of said plurality of multipliers coupled to at least one of said plurality of adders; and
   a plurality of temporary storage devices, an input and output of each of said plurality of temporary storage devices selectively coupled to at least one of said plurality of multipliers and said plurality of adders, said method comprising the steps of:
   computing a first output signal from the adaptive filter;
   responsive to the first output signal, updating a coefficient of the adaptive filter; and
   copying the updated coefficient of the adaptive filter to the fixed filter; or
   copying a fixed coefficient of the fixed filter to the adaptive filter.

15. The method of claim 14, wherein said step of updating further includes the following steps:
   storing a plurality of the input signal samples in the sample memory;
   storing a constant multiplier value in a first storage location;
   retrieving a first filter coefficient value from a first data memory location;
   storing said first filter coefficient value in a first temporary storage location of the plurality of temporary storage devices;
   retrieving a second filter coefficient value from a second data memory location;
   storing said second filter coefficient value in a second temporary storage location of the plurality of temporary storage devices;
   multiplying a first input signal sample of said plurality of input signal sample by said constant multiplier value; and
   adding a product of said multiplying step to said first filter coefficient value, and storing a result of said adding step in said first temporary storage location.

16. The method of claim 15, further comprising the steps of:
   retrieving a third filter coefficient value from a third data memory location;
   storing said third filter coefficient value in a third temporary storage location of the plurality of temporary storage devices, and multiplying a second input signal sample of said plurality of input signal sample by said constant multiplier value; and
   adding a product of said multiplying step to said second filter coefficient value, and storing a result of said adding step in said second temporary storage location.

17. The method of claim 16, further comprising the steps of:

retrieving a fourth filter coefficient value from a fourth data memory location;

storing said fourth filter coefficient value in a fourth temporary storage location of the plurality of temporary storage devices, and multiplying a third input signal sample of said plurality of input signal sample by said constant multiplier value;

adding a product of said multiplying step to said third filter coefficient value, and storing a result of said adding step in said third temporary storage location; and storing said result from said first temporary storage location in said first data memory location.

18. The method of claim 17, wherein each of said first, second, third and fourth temporary storage locations further includes an accumulator.

* * * * *

UNITED STATES PATENT AND TRADEMARK OFFICE
CERTIFICATE OF CORRECTION

PATENT NO. : 5,933,797
DATED : Aug. 3, 1999
INVENTOR(S) : Håakansson et al.

It is certified that error appears in the above-identified patent and that said Letters Patent is hereby corrected as shown below:

Column 3, line 13    Replace "a(t)"
                     With --$\alpha(t)$--

Column 3, line 65    Replace "cancellation"
                     With --cancellation.--

Signed and Sealed this

First Day of February, 2000

Attest:

Attesting Officer

Q. TODD DICKINSON

Acting Commissioner of Patents and Trademarks